United States Patent

[11] 3,593,600

[72] Inventors Clyde M. Adams, Jr.
　　Milwaukee, Wis.;
　　Norman S. Hewitt, Chicago, Ill.; George F. Bartimes, Chicago, Ill.
[21] Appl. No. 821,552
[22] Filed Apr. 29, 1969
[45] Patented July 20, 1971
[73] Assignee Continental Can Company, Inc.
　　New York, N.Y.

[54] BAND SAW BLADE APPARATUS AND METHODS
9 Claims, 12 Drawing Figs.

[52] U.S. Cl. .................................................. 76/112,
　　29/95, 29/180, 219/50, 219/81
[51] Int. Cl. ........................................................ B23d 63/00
[50] Field of Search .......................................... 143/133.2;
　　76/112, 25; 219/82, 81

[56] References Cited
UNITED STATES PATENTS
2,794,458　6/1957　Dosker ......................... 76/112 UX
3,315,548　4/1967　Anderson et al. ............. 76/112
3,383,489　5/1968　Ciranko ......................... 219/81
FOREIGN PATENTS
400,565　10/1933　Great Britain ................. 143/133.2

Primary Examiner—Bernard Stickney
Attorneys—Americus Mitchell, Joseph E. Kerwin and William A. Dittmann ABSTRACT: A method of making a band saw blade by welding strips of high-speed steel to a wide strip of flexible back-forming strip material. The strips of high-speed steel are welded in opposed relationship to opposite sides of the backing material and in opposed relationship at the edge of the flexible back-forming strip material. The composite band saw stock is now cut down the middle of the high-speed strip and the middle of the backing material to form the band saw blank for two or more band saw blades. The composite band saw blank is then milled to give teeth of the desired size and pitch with their cutting edges and top portions of high-speed steel. The base of the teeth, like the backing band, is made of the less tempered material.

PATENTED JUL 20 1971
3,593,600
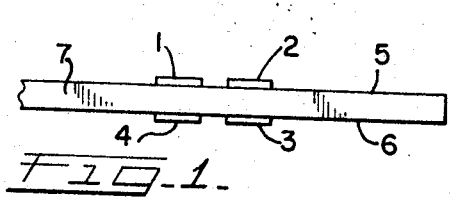
Fig. 1.
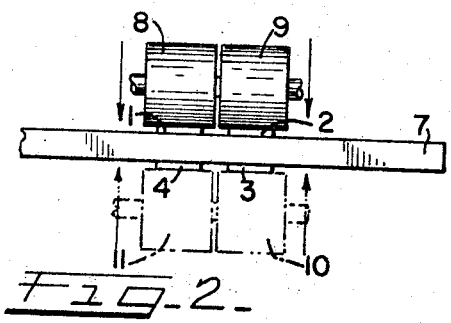
Fig. 2.
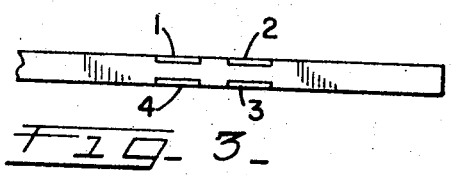
Fig. 3.
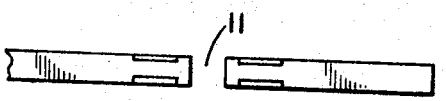
Fig. 4.
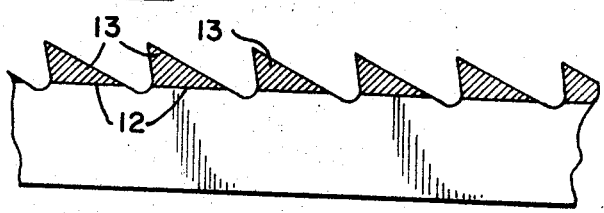
Fig. 5.
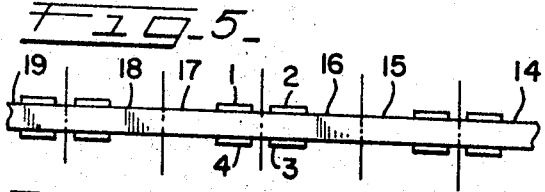
Fig. 6.
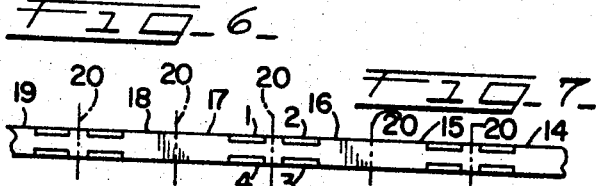
Fig. 7.
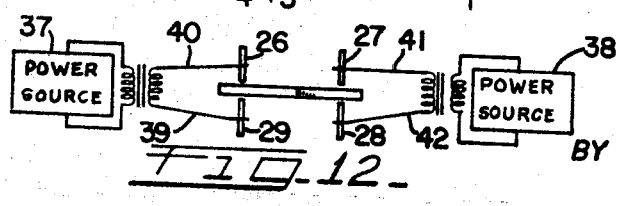
Fig. 12.
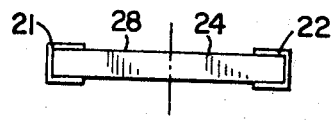
Fig. 8.
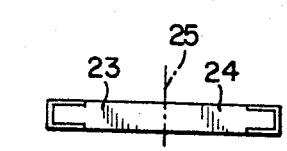
Fig. 9.
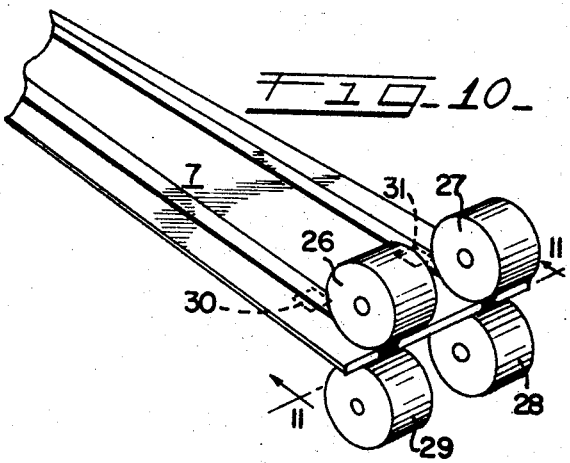
Fig. 10.
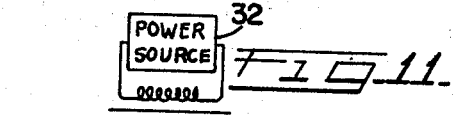
Fig. 11.
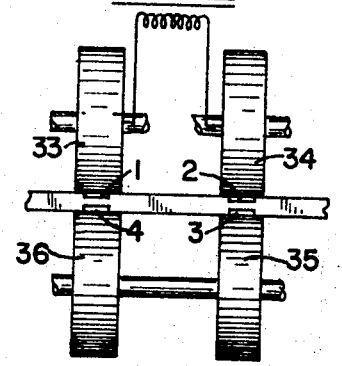
INVENTORS
CLYDE M. ADAMS, JR.
NORMAN S. HEWITT
GEORGE F. BARTIMES
BY *Aurion Mitchell*
ATT'Y.

BAND SAW BLADE APPARATUS AND METHODS

Our invention relates to the production of band saw blades and more particularly, to the production of a metal cutting band saw blade of composite structure.

In the past, metal band saws have been made by fairly complicated processes wherein the tooth section of the band saw blade is carburized. In this method, the rest of the band saw blade is coated with copper so that when the band saw is put into a carburizing furnace, only the teeth are exposed to the carburizing medium. In this way, the teeth and tooth area of the band saw are made quite hard. The carrier or backing body is flexible to allow a long fatigue life.

Another method of producing band saws involves buttwelding a strip of high speed alloy steel onto a strip of flexible low-tempered steel or other base metal. This welding is done by fusion welding or electron beam welding. When such a strip is applied to a backing strip, a very difficult welding problem is presented because of the small areas being welded one to the other. Further, pressure cannot be applied to this surface because if considerable pressure is applied to the area between the backing band and the high speed steel wire, the backing band will probably buckle during the welding process. Thus, the amount of pressure which can be applied to this small area is severely limited. Further, using procedures of this type usually involves a high temperature with a detrimental change of metallurgical structure.

It is an object of the present invention to manufacture two or more band saw blades simultaneously.

It is another object of the present invention to manufacture band saw blanks without the distortion caused by high temperature.

It is another object of our invention to manufacture band saw blades using a minimum amount of high speed steel.

A final object of our invention is to apply high speed strip steel to the upper and lower sides of the edges of a backing band of flexible steel.

In brief, our invention is the application of strips of high speed steel to the upper and lower sides of a broader band of flexible steel, pressing these strips firmly against the base metal flexible material, and at the same time, sending a current of electricity through the juncture of these dissimilar metals to the point that the base metal is rendered plastic and the high speed alloy steel is then pressed into the base metal material and on cooling, a controlled solid state weld is formed. As a result, high speed alloy steel is impregnated into the flexible base steel and if the high speed steel strip is cut down the middle, a band saw blade may be formed by milling the high speed steel to give teeth.

The invention, both as to its organization and method of operation, together with further objects and advantages thereof, is best understood by reference to the following specification taken in conjunction with the accompanying drawings in which:

FIG. 1 shows two strips of high speed alloy steel mounted above a base metal, and two strips mounted below.

FIG. 2 shows the strips above and below being pressed into the base metal as plastic welding takes place.

FIG. 3 shows the high speed alloy steel strips fused into the base metal.

FIG. 4 shows the welded strips after separation.

FIG. 5 shows a side view of a section of a band saw produced by this invention.

FIG. 6 shows a series of strips in position to be welded.

FIG. 7 shows a series of strips after they have been welded.

FIG. 8 shows strips mounted at the edges of a relatively narrow strip of flexible material.

FIG. 9 shows edge welded strips after welding.

FIG. 10 shows a perspective view of roller electrodes mounted to press and weld side welded strips of an alloy steel.

FIG. 11 shows a cross section of FIG. 10 taken along line 11–11 and shows a single power source.

FIG. 12 shows the embodiment of the double power source similar to that of FIG. 11.

FIG. 1 illustrates the concept, showing two alloy steel cutting edges 1 to 4 attached to each side 5,6 of a single piece 7 of base or backing material. These cutting edges are laid in almost exact parallelism along each side of the strip or band 7 of tough, flexible steel. Before the next process takes place, it is understood that each of the surfaces 5,6 exposed must be thoroughly cleaned to provide a contamination-free welding area.

The band saw blades of our invention are composed of two materials, the high speed strip stock 1 to 4 and the flexible steel backing strip 7. Any of a number of steels may be used for the backing strip 7. However, it must have the characteristics of excellent fatigue resistance, flexibility, and inexpensiveness.

A material such as described in the Connoay Pat. No. 3,063,310, may be used as a high speed strip material.

The flat surfaces 5,6 of the backing material must be thoroughly clean and flat in order to assure a good bonding contact with the high speed steel surface with which it is to be welded. The contact area of the backing material and of the high speed steel is pressed together with considerable force. The strip materials may be separated slightly as shown in FIGS. 1 and 2 so that after they are welded to the backing strip, the base backing material may be cut into two sections by cutting through the section between the strips. High speed strip material is applied to the backing strip material both above and below the flat material. As a next step, roller electrodes 8 to 11 are passed over the strip material and exert considerable pressure against the high speed steel material 1 to 4 so that it is forced part way into the base material 7. At the same time that the pressure is being applied through the roller electrodes 8 to 11, a heavy current is conducted through the roller electrodes, through the high speed steel, the base material, the opposed high speed steel strip and back to the power source through the other electrode. The base material 7 is heated by the current to a point where a solid phase weld is accomplished because of the heat and the very considerable pressure exerted between the base material and the high speed steel strip. The welding operation is accomplished in about one-thirtieth to one one-hundredth of a second.

After the solid-state welding has taken place, the high speed steel strips 1 to 4 are embedded into the backing material in the manner shown in FIG. 3.

Where carbide material is used, the materials may be fastened by swaging.

The backing is now cut through in the section 11 between the high speed steel strips to form two band saw blades, FIG. 4.

The next step in preparing the blade, FIG. 5, is the step of milling out the spaces between the teeth 12 to the point that only the top portion 13 of each tooth is of high speed steel. Thus, the areas receiving the most wear in normal usage are of high speed steel. The elongated band saw blank is further processed by tempering to give the teeth the requisite and final hardness.

The essential process outlined above may readily be applied to a composite structure allowing an appreciable number of band saw blades to be made from one width of base material stock. A multiplicity of such blades 14 to 19 are shown in FIG. 6.

As shown in this embodiment, six or more band saw blades 14 to 19 are made from one broad strip if the cutting or severing is made along the dotted lines indicated in FIGS. 6 and 7.

The high speed steel strips 1 to 4 are pressed into the backing similar to the manner shown in FIGS. 1 to 4 for an individual pair of strips to give a composite strip as shown in FIG. 7. Once they are pressed and solid phase welded into the backing, the backing strip may be severed according to the lines 20 of FIG. 7. In this way, a large number of band saw blade blanks may be made from a single strip of backing material.

The base material stock can be made very thin and the thickness of the high speed steel strips may be made much thinner to take up as much of the thickness of the base steel stock as one may wish for the particular application for which the band saw is to be used. If a small kerf is desired, thin materials may be used while if a heavy duty saw is desired, heavier materials are used to give the desired durability.

If it is desired to put the strip steel along the edge of the band saw stock, a U-shaped strip 21,22 of high speed steel may be used and pressed over each edge. In this way, during the welding operation, a roller or some other pressure means presses the high speed steel 21,22 onto the edge of the base stock 23, 24. Considerable pressure is applied above and below the stock to weld and press the high speed steel into the base stock as shown in FIG. 9.

After the high speed steel is fastened to the edges of the band saw stock, the stock may be slit along the line 25 to form two band saw blades. Teeth are milled onto each blank to form a saw as illustrated in FIG. 5.

A schematic apparatus for accomplishing the effect desired in FIGS. 1 to 4 and 6 to 9 is shown in FIG. 10. Here, electrode rollers 26 to 29 are shown mounted above and below the base stock 7. The current flow through these rollers may be supplemented by current flow through pressured slides 30,31 above and below to allow a longer time for current to flow through the strips and base stock. Ordinarily, the slides 30,31 would be up stream of the rollers so that heating is initiated at the slide and the rollers heat and press to complete the solid-state weld.

A low inductive power source is made by using a single power source (FIG. 11) and conducting the current from electrode wheels 33,34 through the strips 1 to 4, through base stock 7, and through the electrically connected electrode rollers 35,36 to form a closed circuit of relatively low inductance.

In this way, long leads are avoided and inductance losses are kept to a minimum. Further, a single power source is used and the degree of resistance at specific points is varied by the compression pressure applied to the wheel electrodes at those points. As readily appreciated, a number of these power sources can be mounted up and down the strip.

The embodiment shown in FIG. 6 uses three of these power sources, plus possible end power sources.

An alternative power source which is used as end power sources in FIG. 10 is shown in FIG. 12. In this case, each of the electrodes of the opposed pairs of wheel electrodes 27,28 and 26,29 are connected to individual power source leads 29 to 42, thus affording a greater degree of control of the electricity passing through each of the weld spots. As can readily be appreciated, these power sources can be applied to the end welding of the high speed strips of FIGS. 8 and 9.

Our invention has numerous advantages over the prior art. The areas of high wear on the saw are made of high speed steel, while the areas of less wear are specially cast from material having the characteristics of high flexibility and economical cost.

Our invention allows greater possible pressure on the area to be welded since we use a lap weld rather than a flat weld. Our device allows a low inductance power supply to conduct current to the weld spots. Straightening is not necessary to the extent that it has been in former devices and methods. Our blade may be made of any desired thinness because whatever the thinness of the blade, the bonded area of the high speed steel is always relatively great compared to the thickness of the blade.

Our invention can be operated as a continuous process rather than batch process as in electron beam welding.

Our invention is adapted to the use of sonic welding between the blank and the strip. The use of sonic welding avoids any twist of the blade during welding and thus, straightening of the blade after welding is not necessary.

The foregoing is a description of an illustrative embodiment of the invention, and it is applicant's intention in the appended claims, to cover all forms which fall within the scope of the invention.

What we claim is:

1. A method of making a saw blade from elongated flat base stock and high speed strip material comprising the steps of:
   pressing a first long narrow section of high speed metal against one side of a flat elongated base stock which is broader than said first section,
   pressing a second long narrow section of high speed metal against the other side of said flat elongated base stock which is broader than said second section at a position opposite to said first section of high speed metal, whereby said first and second sections are pressed against opposing sides of said flat elongated base stock,
   conducting sufficient electricity through said section, said base stock and said opposing section to form a solid phase weld at the same time that pressure is applied, and
   milling teeth into said treble thickness section.

2. The method of making a saw blade from a flat base stock and high speed strip material comprising the steps of:
   placing each strip of a pair of elongate strips in opposition against parallel broad surfaces of a sheet of backing stock, whereby said strips cover part of the broad surfaces of said sheet;
   pressing each strip against opposing sides of a flexible backing material;
   simultaneously conducting electricity through said strip, said backing material and said opposing strip to form a solid phase weld;
   severing said sheet of backing material and said welded elongate strip along a line parallel to the center line of said elongate strip to provide composite blanks having a section of single thickness and a section of treble thickness; and
   milling teeth into said treble thickness section whereby at least the tips of the teeth of the resulting saw blade are of treble thickness.

3. A method of making a saw blade from a flat base stock and high speed strip material as set forth in claim 2 in which the step of pressing at least one pair of elongate strips of high speed metal comprises the steps of:
   pressing several pairs of high speed metal strips against said base stock, each one of said pair being mounted in opposition on opposite sides of said backing material to the other of said pair.

4. A method of making a saw blade from a flat base stock and high speed strip material as set forth in claim 3 having as a first step:
   mounting pairs of strips of high speed material in groups of two pairs with close spacing between said two pairs of a group and greater space between said groups of two pairs.

5. A method of making a saw blade from a flat base stock and high speed strip material as set forth in claim 4 in which said step of severing said sheet of base stock material comprises the steps of:
   severing said sheet of base stock material between said pairs of closely spaced strips; and
   severing said sheet of base stock material in the greater space between said groups of two pairs.

6. A method of making a saw blade from a flat base stock and a high speed strip material as set forth in claim 3 in which the step of severing said sheet of base stock and said elongate strip comprises:
   cutting said flat base stock along a line between said groups of pairs and between said pairs of elongate strips whereby a plurality of saw blanks are formed.

7. A method of making a saw blade from elongated flat base stock and high speed strip material as set forth in claim 1 comprising the additional step of:
   pressing a third section which connects the first and second sections against the edge of said flat elongated base stock at the same time that said first and second sections are pressed whereby said first and second sections are held at the edge of said flat base stock and said first, second and third sections are pressed against the elongated flat base stock adjacent its edge.

8. A method of making a saw blade from elongated flat base stock and high speed strip material as set forth in claim 2 wherein the steps of pressing comprise the steps of:

placing paired rollers on opposite sides of said treble thickness layers, pressing said rollers against said treble thickness layers, conducting electricity through one roller of said pair of rollers, one strip of high speed strip material, said flat base stock, the second strip of high speed strip material and the second roller of said rollers whereby a solid state phase weld is formed, and milling teeth into said treble thickness section.

9. The method of making a saw blade from a flat base stock and high speed strip material as set forth in claim 8 having immediately after the step of conducting electricity the additional step of:

moving said rollers and treble thickness section relative to each other, whereby said rollers pass over fresh parts of said treble thickness section to weld succeeding parts of said section and form a continuous weld.